United States Patent
Anderson

(10) Patent No.: US 8,903,999 B2
(45) Date of Patent: Dec. 2, 2014

(54) METHOD AND SYSTEM FOR CALCULATING AND CHARTING WEBSITE PERFORMANCE

(71) Applicant: Level 3 Communications, LLC, Broomfield, CO (US)

(72) Inventor: Michael Joel Anderson, Larkspur, CO (US)

(73) Assignee: Level 3 Communications, LLC, Broomfield, CO (US)

(*) Notice: Subject to any disclaimer, the term of this patent is extended or adjusted under 35 U.S.C. 154(b) by 170 days.

(21) Appl. No.: 13/797,155

(22) Filed: Mar. 12, 2013

(65) Prior Publication Data

US 2014/0280182 A1  Sep. 18, 2014

(51) Int. Cl.
*G06F 15/173* (2006.01)
*G06F 17/30* (2006.01)

(52) U.S. Cl.
CPC .................. *G06F 17/30336* (2013.01)
USPC .......................................... 709/224; 709/223

(58) Field of Classification Search
USPC ................ 709/200, 217, 203, 223, 224
See application file for complete search history.

(56) References Cited

U.S. PATENT DOCUMENTS

| | | | | |
|---|---|---|---|---|
| 7,003,560 B1* | 2/2006 | Mullen et al. | ................ | 709/223 |
| 7,181,474 B2* | 2/2007 | Asherman | ............................ | 1/1 |
| 7,231,606 B2* | 6/2007 | Miller et al. | ................. | 715/738 |
| 7,757,175 B2* | 7/2010 | Miller | .......................... | 715/738 |
| 8,327,271 B2* | 12/2012 | Miller | .......................... | 715/738 |
| 8,560,504 B2* | 10/2013 | Parker et al. | ................. | 707/688 |
| 8,606,907 B1* | 12/2013 | Wogulis et al. | ............... | 709/224 |
| 8,799,769 B2* | 8/2014 | Liang | ........................... | 715/234 |
| 8,842,119 B2* | 9/2014 | Hubbard | ..................... | 345/440 |
| 8,843,625 B2* | 9/2014 | Baumback et al. | .......... | 709/224 |
| 8,849,981 * | 9/2014 | Zuzga et al. | .................. | 709/224 |
| 2003/0084053 A1* | 5/2003 | Govrin et al. | ................ | 707/100 |
| 2003/0225663 A1* | 12/2003 | Horan et al. | .................... | 705/36 |
| 2004/0030992 A1* | 2/2004 | Moisa et al. | ................. | 715/513 |
| 2005/0187950 A1* | 8/2005 | Parker et al. | ................ | 707/100 |
| 2006/0217930 A1* | 9/2006 | Chang et al. | ................. | 702/186 |
| 2013/0097486 A1* | 4/2013 | Miller | .......................... | 715/237 |
| 2014/0052732 A1* | 2/2014 | Softky | ......................... | 707/741 |

* cited by examiner

*Primary Examiner* — Sargon Nano

(57) ABSTRACT

A web performance index tool along with related systems and methods for calculating and charting website performance that provide a single metric snapshot indicating how an end user would perceive the performance of a website. The metric provides an objective way to evaluate website performance by using an algorithm that measures the speed, quantity, and quality of the web content.

12 Claims, 4 Drawing Sheets

Example WPI Test Data

| | Time to First Byte | Doc Complete Load Time | Fully Loaded Time | Fully loaded Bytes In |
|---|---|---|---|---|
| level3.com | 0.422 | 1.715 | 2.481 | 183 |
| cnn.com | 0.213 | 6.296 | 8.113 | 1156 |
| amazon.com | 0.227 | 2.949 | 8.246 | 1274 |
| dell.com | 0.376 | 2.793 | 5.884 | 720 |
| eaton.com | 0.331 | 4.298 | 4.769 | 438 |

WPI= (200/Fully Loaded Time) + (75/doc complete time) + (5/time to first byte) + (log(fully loaded size)*10)

| Web Site | WPI |
|---|---|
| level3.com | 158.8 |
| cnn.com | 90.7 |
| amazon.com | 102.8 |
| dell.com | 102.7 |
| eaton.com | 100.9 |

Web Performance Index (WPI) = (200/Fully Loaded Time) + (75/doc complete time) + (5/time to first byte) + (log(fully loaded size)*10)

Fig. 2

| Example WPI Test Data | | | | |
|---|---|---|---|---|
|  | Time to First Byte | Doc Complete Load Time | Fully Loaded Time | Fully loaded Bytes In |
| level3.com | 0.422 | 1.715 | 2.481 | 183 |
| cnn.com | 0.213 | 6.296 | 8.113 | 1156 |
| amazon.com | 0.227 | 2.949 | 8.246 | 1274 |
| dell.com | 0.376 | 2.793 | 5.884 | 720 |
| eaton.com | 0.331 | 4.298 | 4.769 | 438 |

WPI= (200/Fully Loaded Time) + (75/doc complete time) + (5/time to first byte) + (log(fully loaded size)*10)

| Web Site | WPI |
|---|---|
| level3.com | 158.8 |
| cnn.com | 90.7 |
| amazon.com | 102.8 |
| dell.com | 102.7 |
| eaton.com | 100.9 |

Fig. 3

METHOD AND SYSTEM FOR CALCULATING AND CHARTING WEBSITE PERFORMANCE

TECHNICAL FIELD

Aspects of the present disclosure involve networks and more particularly to a computerized method and system of evaluating network site performance.

BACKGROUND

While managing website downtime is important, managing slow website performance can be just as vital. Companies rely on websites to market to customers, conduct e-commerce, and run internal business, among other functions. In today's business environment, it is increasingly important to have a website that loads consistently, quickly, and provides a rich experience. An Internet user's attention span can quickly be lost if a web page fails to load or fails to load in an agreeable time. Similarly, an Internet user's attention may be lost when a website does not include rich graphics, videos, or other rich content. For companies conducting e-commerce, there can be a direct financial benefit to having a faster performing, rich website. When web pages load quickly, customers are less likely to abandon "shopping carts", more likely to complete purchases, and more likely to be satisfied customers.

There are a number of website performance tools available on the Internet. These tools typically provide a number of performance statistics such as web page loading time and web page size. While this information may be helpful, the tool leaves it to the user to decide how to interpret the performance data. Additionally, there is no metric to compare data points with other websites or to gauge the end user's overall browsing experience.

It is with these inadequacies and concerns in mind, among others, that various aspects of the present disclosure were conceived and developed.

SUMMARY

Implementations described and claimed herein address the foregoing problems by providing a computerized method and system of evaluating network site performance. The method and system is performed by using at least one computing device, where the computing device(s) receives an identification of at least one network site to be tested, which can be a website that is tested over the internet. The computing device(s) sends an automated command to a testing server, which includes the identification of at least one network site, or website, to be tested. The testing center performs a plurality of performance tests on each of the network sites and receives the testing data. A web performance calculator then accesses the testing data and calculates an index based on aggregating at plurality of operations that is performed on the testing data. The index is stored in a user interface server for display of the index for each of the tested network sites. In one embodiment, the plurality of operations to be aggregated are functions of the fully loaded page time, the document complete time, the time to first byte, and the fully loaded page size.

Other implementations are also described and recited herein.

BRIEF DESCRIPTION OF THE DRAWINGS

FIG. 2 is a formula used to compute the web performance index.

FIG. 3 is an example of collected raw data and calculated web performance index.

DETAILED DESCRIPTION

Aspects of the present disclosure involve a web performance index tool along with related systems and methods for calculating and charting website performance that provide a single metric snapshot indicating how an end user would perceive the performance of a website. The metric provides an objective way to evaluate website performance by using an algorithm that measures the speed, quantity, and quality of the web content.

The web performance index may test hundreds of the world's most popular websites, everyday, in order to provide an adequate sample size to gauge performance. With this information, the web user's relative browsing experience is measured in relation to their experience with other websites. The user can choose an industry sector as well as a date range for comparison. Current web performance tools typically do not provide an objective metric to evaluate performance as compared to other websites, but instead force the user to interpret the data subjectively, among other distinctions.

In one specific example, the web performance index tool uses a web performance testing engine, such as provided by totalsiteperformance.com, to collect web performance data and then uses a unique formula to calculate a single website user experience measurement. The computed experience measurement for a given website can then be used to compare the performance of various websites in an objective way. It is also possible to use other mechanisms to collect or calculate web performance.

Figure 1:
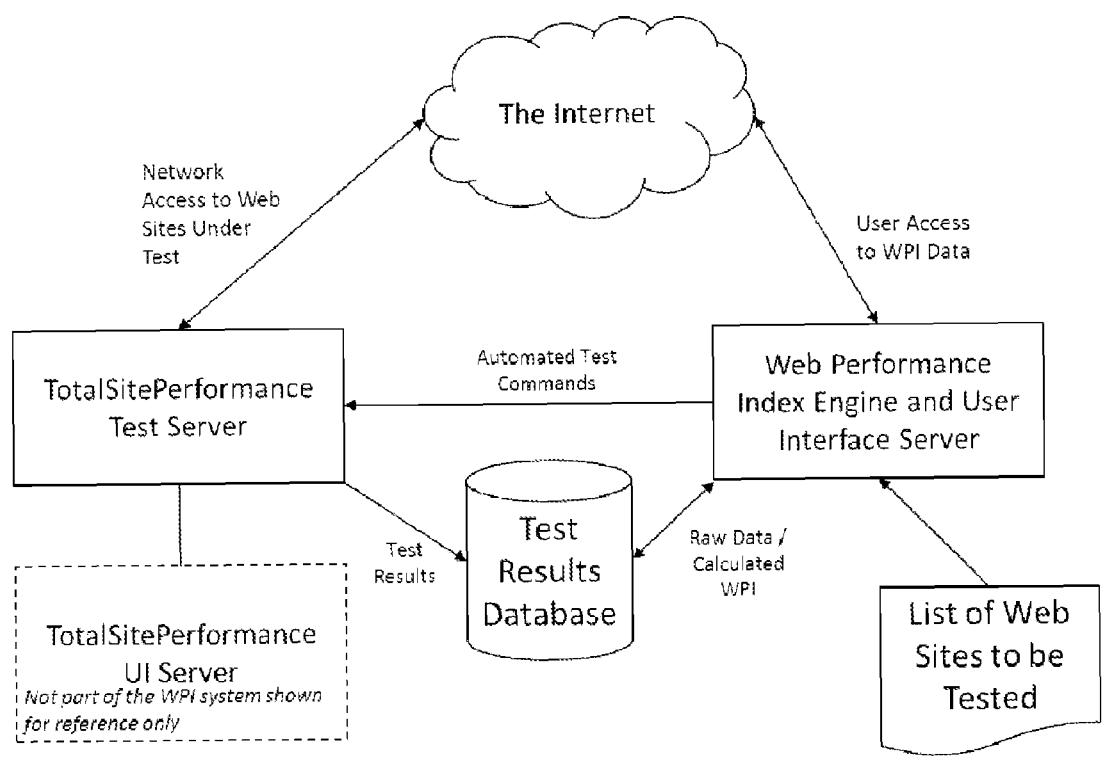
FIG. 1 is a functional diagram of a system for calculating and charting website performance.

The index tool may be completely automated. Referring to FIG. 1, the tool is setup to collect performance data from an inputted list of websites. In a first embodiment, the tool tests five hundred different websites, but the exact number and specific websites on the list can vary. The specific websites are chosen in order to provide an adequate sample size within a variety of industry sectors. Each day the tool schedules a set of performance tests. In one specific example, the tool uses an application programming interface to pass testing parameters to the performance testing engine at totalsiteperformance.com, which then initiates the necessary tests. When a signal is received or otherwise, the performance testing engine conducts a performance test against each of the websites on the list, or a subset of the sites identified, and collects the raw data. In the first embodiment, the performance tests for a subset of sites on the list are scheduled to take place hourly. Over the course of some period of time, all of the websites are tested, and then testing begins again to update performance results. Again, the frequency of testing can be altered to provide an accurate picture of web performance.

During the tests, the tool collects the following data points for each site tested: fully loaded page time, document complete time, time to first byte, and fully loaded size. The fully loaded page time is a measurement of the time it takes for the web page to completely load. This metric shows how long the user must wait before she can interact with the complete web page. The document complete time is a measurement of the time it takes to load enough of the web page so that the user can begin to interact with the page. The time to first bye is a measurement of the amount of time it takes before the first element of the web page begins to load. This measures the initial responsiveness of the website. Finally, the fully loaded size is a measure that shows the relative richness of the content provided to the end user. This is a measure of the amount of digital information displayed on the website. All of the factors listed above contribute to website performance and a web user's overall browsing experience. Since websites are designed for interaction with a web user, collecting data points that measure the amount of time it takes to load website information provides an objective way to gauge a web user's experience. Furthermore, taking into account the size of the web page has a normalizing effect so that a rich web page with a lot of data to load can be objectively compared to a skinny web page with not much data to load.

The corresponding performance test results are stored in a results database. The web performance index tool then accesses the performance testing results and computes the web performance index as per the equation in FIG. 2. The results can be classified by industry and plotted on a graph. The frequency of calculations, the size of the sample, and the specific list of websites can vary accordingly.

FIG. 2 displays the equation for calculating the web performance index. The equation gauges the performance of certain factors, normalizes each factor based on the individual expressions in the equation, and produces a single performance number, or index, for each testing site that aggregates all of the factors. The equation takes the four factors listed above into account when computing the index.

Three of the factors are measured in seconds: time to first byte, document complete time, fully loaded page time. The time to first byte is going to be the shortest time calculated, since it is a measure of the time it takes for the first byte of data begins to load. Correspondingly, the fully loaded page time will be longest time calculated, since it is a measure of the time it takes for the web page to completely load. But, the time differences between the factors can be quite miniscule, when considering the amount of possible data to load and the Internet connection speed. Each of the three factors is measured differently when calculating each expression, as indicated by the equation in FIG. 2. More particularly, the numerator of each of the three expressions provides a relative weight for each of the three factors so that when the factors are aggregated the sum provides an accurate assessment of overall web performance. For example, in FIG. 2, the expression dealing with the fully loaded time is calculated by dividing 200 by the fully loaded time, whereas the expression dealing with document complete time is calculated by dividing 75 by the document complete time. The exact weight given to each of the three factors (i.e., the value of the numerator of each expression) can vary accordingly or can be calculated through a wholly different operation in order to provide an accurate index of web performance.

The fourth factor in the web performance index, fully loaded size, is measured in bytes. Taking into account the amount of digital information on the website will normalize the results so that a website with few bytes of data to load can be compared on the same footing with a website with much more data to load. The expression, in FIG. 2, that deals with the fully loaded size is calculated by multiplying 10 to the logarithm of the fully loaded size to base 10. As discussed previously, the exact expression used to measure the amount of information that the web page loads can change accordingly. For example, the amount of bytes displayed on a typical web page could significantly change in the future, which would necessitate a change to the expression in order to accurately portray overall web performance.

The sum of the expressions in the equation is a single number or index, called the web performance index. The value of the index represents a consideration of all of the factors previously discussed and provides the user with an objective snapshot of overall web performance. The user can view the web performance index for certain industry sectors over a chosen timeline. This information can be displayed graphically, in order to easily gauge web performance over a chosen timeframe.

Additionally, other factors can be considered when computing the web performance index. For example, additional metrics that occur between time to first bye and document complete time can be considered when computing the index. The factors in the equation of FIG. 2 are not exhaustive, but merely representative of a first embodiment of factors to be considered when computing a web performance index.

FIG. 3 depicts the testing results of five different websites. Each website was tested for the four factors necessary to compute the web performance index, per the equation in FIG. 2. The performance test results for each of the factors in the equation in FIG. 2 are given in FIG. 3. Additionally, FIG. 3 depicts the singular web performance index for each of the websites, wherein a higher web performance index represents better performance. Conversely, a lower web performance index represents lower website performance and lower web user browsing experience.

The disclosure of the web performance index is made in the context of websites on the Internet, but the web performance index is equally applicable to other computer networks and sites within those networks that users may access through a network, such as an intranet within an organization. The disclosure of the web performance index in relation to websites on the Internet is not meant to be limiting, but merely representative of a type of computer network to which the web performance index is applicable.

Figure 4:
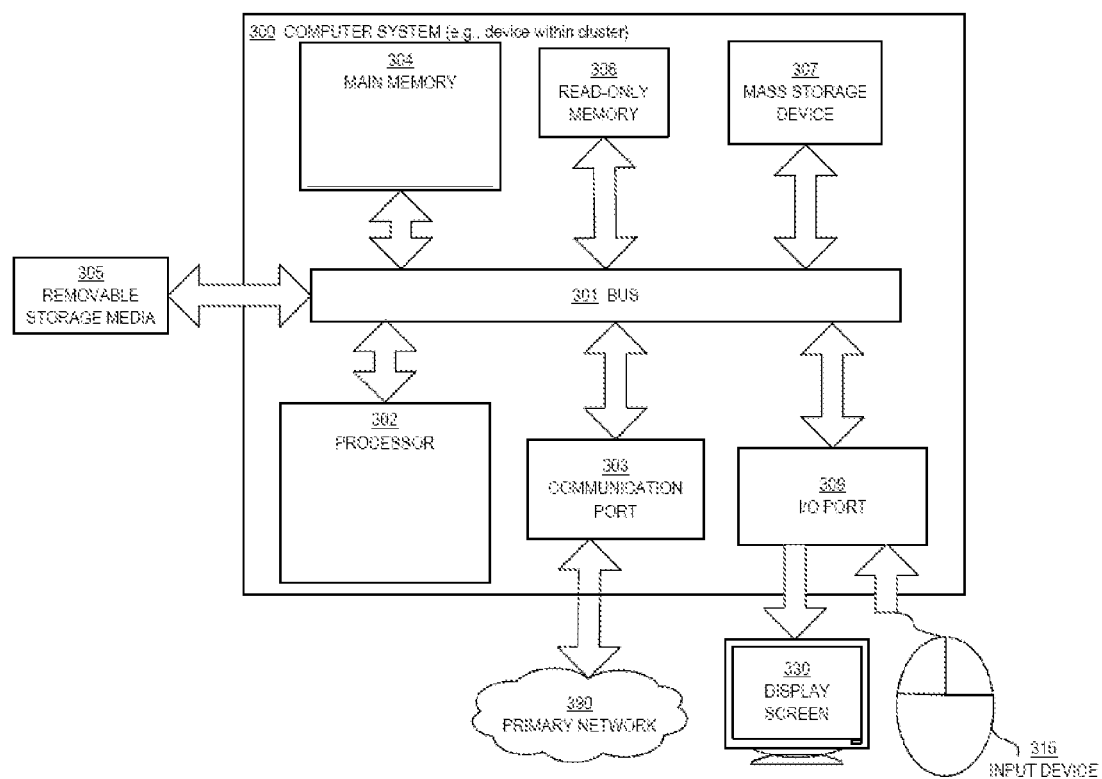
FIG. 4 is an exemplary computing system for implementing various aspects of the systems and methods described herein.

FIG. 4 is a schematic diagram of a computer system 300 upon which embodiments of the present disclosure may be carried out and implemented. For example, one or more computing devices 300 (e.g., servers, routers, gateways, etc.) may be used to perform the functions of the web performance index for a primary network (e.g., primary network 390) and related secondary networks.

According to the present example, the computer system 300 includes a bus 301 (i.e., interconnect), at least one processor 302, at least one communications port 303, a main memory 304, a removable storage media 305, a read-only memory 306, and a mass storage 307. Processor(s) 302 can be any known processor, such as, but not limited to, an Intel® Itanium® or Itanium 2® processor(s), AMD® Opteron® or Athlon MP® processor(s), or Motorola® lines of processors. Communications ports 303 can be any of an RS-232 port for use with a modem based dial-up connection, a 10/100 Ethernet port, a Gigabit port using copper or fiber, or a USB port. Communications port(s) 303 may be chosen depending on a network such as a Local Area Network (LAN), a Wide Area Network (WAN), or any network to which the computer system 300 connects (e.g., primary, network 390). The computer system 300 may be in communication with peripheral devices (e.g., display screen 330, input device 316) via Input/Output (I/O) port 309.

Main memory 304 can be Random Access Memory (RAM), or any other dynamic storage device(s) commonly known in the art. Read-only memory 36 can be any static storage device(s) such as Programmable Read-Only Memory (PROM) chips for storing static information such as instructions for processor 302. Mass storage 307 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used. [0022] Bus 301 communicatively couples processor(s) 302 with the other memory, storage and communications blocks. Bus 301 can be a PCI/PCI-X, SCSI, or Universal Serial Bus (USB) based system bus (or other) depending on the storage devices used. Removable storage media 305 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable readonly memories (EPROMs), electrically erasable programmable read-only memories (EEPROMs), magnetic or optical cards, flash memory, or other type of media/machinereadable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computerized method of evaluating network site performance, the method comprising:
   receiving, using at least one computing device, an identification of at least one network site to be tested;
   sending, using the at least one computing device, at least one automated command to a testing server, the at least one automated command comprising the identification of the at least one network sites to be tested and whereby the testing server performs a plurality of performance tests on the at least one network sites to be tested;
   receiving performance testing data from the plurality of performance tests by the testing server for each of the at least one network sites to be tested;
   accessing the performance testing data by a web performance index engine, wherein the web performance index engine:
   calculates an index for each of the at least one network sites to be tested, the index comprising a single value that is an aggregation of a plurality of operations to be performed on the performance testing data based on a fully loaded time factor, a document complete time factor, a time to first byte factor, and a fully loaded size factor, and
   stores the index for each of the at least one of the network sites to be tested in a user interface server for display of the index for each of the at least one of the network sites to be tested.

2. The method of claim 1, wherein the aggregation of the plurality of operations is a summation of a first operation, a second operation, a third operation, and a fourth operation, wherein
   the first operation is 200/(fully loaded time),
   the second operation is 75/(document complete time),
   the third operation is 5/(time to first byte), and
   the fourth operation is 10*(Log(fully loaded size)).

3. The method of claim 1, wherein the at least one automated command is performed by the testing server on an hourly basis.

4. The method of claim 1, wherein the user interface server includes the web performance index engine.

5. The method of claim 1, wherein the identification of the at least one network sites comprises a list of network site addresses.

6. The method of claim 1, wherein the at least one network sites comprises at least one website.

7. A system for evaluating website performance comprising:
   at least one computing device, whereby an identification of at least one network sites to be tested is received;
   a testing server, which:
   receives at least one automated command from the at least one computing device whereby the at least one automated command comprises the identification of the at least one network sites to be tested and whereby the testing server performs a plurality of performances tests on the at least one network sites to be tested,
   receives performance testing data from the plurality of performance tests for each of the at least one network sites to be tested;
   a web performance index engine, which:
   accesses the performance testing data,
   calculates an index for each of the at least one network sites to be tested, the index comprising a single value that is an aggregation of a plurality of operations to be performed on the performance testing data based on a fully loaded time factor, a document complete time factor, a time to first byte factor, and a fully loaded size factor, and
   stores the index for each of the at least one network sites to be tested in a user interface server for display of the index for each of the at least one network sites to be tested.

8. The system of claim 7, wherein the aggregation of the plurality of operations is a summation of a first operation, a second operation, a third operation, and a fourth operation, wherein
   the first operation is 200/(fully loaded time),
   the second operation is 75/(document complete time),
   the third operation is 5/(time to first byte), and
   the fourth operation is 10*(Log(fully loaded size)).

9. The system of claim 7, wherein the at least one automated command is performed by the testing server on an hourly basis.

10. The system of claim 7, wherein the user interface server comprises the web performance index engine.

11. The system of claim 7, wherein the identification of the at least one network sites comprises a list of network site addresses.

12. The system of claim 7, wherein the at least one network sites comprises at least one website.

* * * * *